United States Patent [19]
Cook

[11] Patent Number: 5,224,588
[45] Date of Patent: Jul. 6, 1993

[54] PLUNGER SWITCH PROVIDING RELIEF FOR AN EXCESS PLUNGER LOAD

[75] Inventor: Stephen J. Cook, Hockley, England

[73] Assignee: Ford Motor Company, Dearborn, Mich.

[21] Appl. No.: 868,605

[22] Filed: Apr. 14, 1992

[30] Foreign Application Priority Data

Apr. 15, 1991 [GB] United Kingdom ............... 9107959

[51] Int. Cl.⁵ ............................................. B65D 45/00
[52] U.S. Cl. .......................... 200/327; 200/DIG. 22; 200/61.089; 200/530
[58] Field of Search ............ 200/327, 293, 434, 61.08, 200/DIG. 22, 61.89, 16 B, 16 E, 327, 530, 534, 537, 540, 520

[56] References Cited

U.S. PATENT DOCUMENTS

| | | | |
|---|---|---|---|
| 3,624,330 | 11/1971 | Bognar | 200/534 |
| 4,154,996 | 5/1979 | Arnold | 200/434 |
| 5,031,737 | 7/1991 | Dzioba et al. | 200/61.89 |

FOREIGN PATENT DOCUMENTS

| | | |
|---|---|---|
| 409015 | 11/1931 | United Kingdom . |
| 409075 | 12/1931 | United Kingdom . |
| 409510 | 5/1932 | United Kingdom . |
| 2068665 | 9/1983 | United Kingdom . |
| 2077505 | 9/1984 | United Kingdom . |

Primary Examiner—Henry J. Recla
Assistant Examiner—David J. Walczak
Attorney, Agent, or Firm—Mark L. Mollon; Roger L. May

[57] ABSTRACT

A switch (10) comprises a switch housing (11), a plunger (12) located within the switch housing (11), one end of the plunger (12) extending out of the housing (11), the plunger (12) being capable of limited movement relative to the housing (11). An electrical contact (17) is provided on the plunger (12) and is adapted to engage an electrical contact (19, 20) associated with the housing (11) at an outward limit of movement of the plunger (12). A stop (25) is provided coaxially of the plunger (12) for engagement of the end (18) of the plunger (12) at a normal inward limit of movement of the plunger (12). The stop (25) is displaceable axially when a load in excess of a predetermined magnitude is applied thereto by the plunger (12) to permit movement of the plunger (12) beyond its normal inward limit of movement relative to the housing (11).

6 Claims, 2 Drawing Sheets

PLUNGER SWITCH PROVIDING RELIEF FOR AN EXCESS PLUNGER LOAD

The present invention relates to switches and in particular to pedal box switches, ie. stop lamp switches, for motor vehicles, but may be used in other applications where there is requirement for the switch to operate in response to movement of a component.

A stop lamp switch for a motor vehicle is required to operate in response to a small movement of the brake pedal, typically 4 mm at the switch. The switch includes a plunger which engages the pedal or a bracket attached thereto and is depressed thereby when the pedal is in its rest position. In order that the switch operates within the required range of movement of the pedal, the switch must be positioned accurately, so that upon movement of the pedal the plunger will move with it until electrical contacts come into engagement. Hitherto, the plunger, which is located through a necktube defined by the switch housing, has been dimensioned so that when the switch is correctly located, the plunger will be depressed fully into the necktube when the pedal is in its rest position, the pedal or a bracket attached thereto engaging against the end of the necktube. In this manner, the switch may be correctly located so that the contacts are brought into engagement after the desired amount of movement of the pedal.

If however the brake pedal returns beyond its normal rest position, due for example to wear or tolerance build up, loads in excess of 400N may be applied to the end of the necktube which may dislodge the switch. As a result, the switch may become inoperative, the brake lamps being left permanently on when the pedal returns to its normal rest position. This problem is particularly prevalent on vehicles where a cross shaft transfers brake pedal effort across the vehicle to a brake booster mounted on the opposite side of the vehicle to the driver. Such systems suffer from inherent tolerance build up in the mounting bushes and joints, which allow the brake pedal to be lifted beyond its normal rest position.

According to one aspect of the present invention, a switch comprises; a switch housing, a plunger located within the switch housing, one end of the plunger extending out of the housing, the plunger being capable of limited movement relative to the housing, an electrical contact being provided on the plunger, said electrical contact being adapted to engage an electrical contact associated with the housing at an outward limit of movement of the plunger relative to the housing, stop means being provided coaxially of the plunger for engagement of the end of the plunger remote from said one end at a normal inward limit of movement of the plunger relative to the housing, said stop means being displaceable axially when a load in excess of a predetermined magnitude is applied thereto by the plunger, movement of the stop means permitting movement of the plunger beyond its normal inward limit of movement relative to the housing.

With the switch according to the present invention, the switch may be correctly located with respect to the brake pedal at its normal rest position by locating the switch such that when the end of the plunger extending from the switch housing engages the pedal at its rest position, the remote end of the plunger engages the stop means. If the pedal now returns beyond its normal rest position so that the load applied to the stop means exceeds the predetermined value, the stop means will be displaced axially permitting the plunger to move beyond its normal inward limit, so that the additional rearward movement of the pedal may be accommodated without the switch housing being displaced. When the pedal returns to its normal rest position, the gap between the electrical contact on the plunger and that on the switch housing will remain, so that the switch will operate normally.

An embodiment of the invention is now described, by way of example only, with reference to the accompanying drawings in which.

Figure 1:
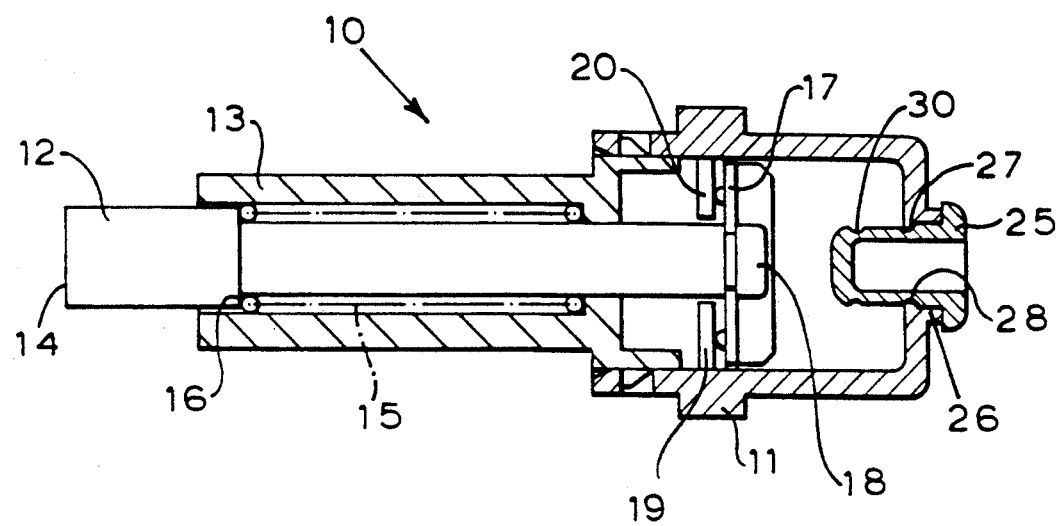
FIG. 1 illustrates in sectional elevation a vehicle brake lamp switch in accordance with the present invention.

As illustrated in FIG. 1, a stop lamp switch 10 has a switch housing 11. A plunger 12 is located within the housing 11 coaxially of a necktube 13 defined by the housing 11, one end 14 of the plunger extending from the end of the necktube 13. A compression spring 15 acts between a shoulder 16 on the plunger 12 adjacent end 13 thereof and the housing 11 to urge the plunger 12 outwardly of housing 11.

An electrical contact 17 is provided on the inner end 18 of plunger 12 and contacts 19 and 20 mounted on housing 11 are arranged to be engaged by the contact 17 and to limit movement of the plunger 12 outwardly of the housing 11.

A plug 25 is mounted coaxially of the plunger 12 through an aperture 26 in the end wall of housing 11 remote from the necktube 13. The plug 25 is retained in position with respect to the housing 11 by means of a rib 27 which surrounds the aperture 26 and engages in a circumferential groove 28 in the plug 25. The plug 25 is displaceable axially relative to the housing 11 away from plunger 12, when a predetermined load, for example 70N, is applied to the inner end of plug 25, this load being sufficient to force the rib 27 out of engagement with the groove 28.

A second circumferential groove 30 is provided adjacent the inner end of plug 25 to retain the plug 25 in engagement with the housing 11 after it has been displaced axially.

Figure 2:
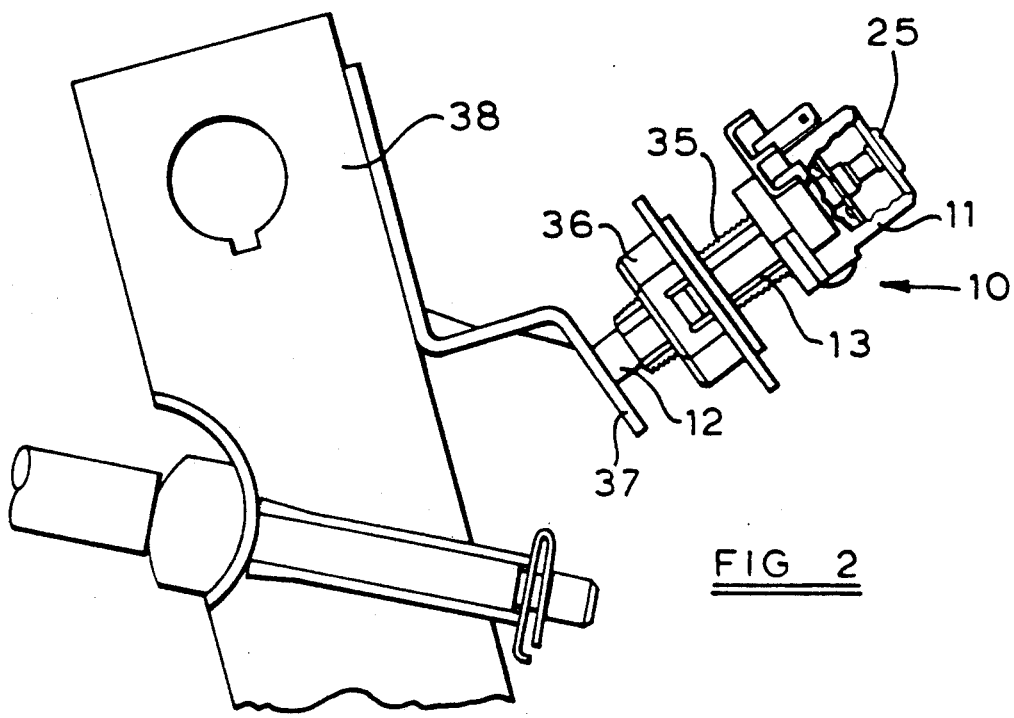
FIG. 2 is a partial sectional view of the switch illustrated in FIG. 1 in relation to a brake pedal in its normal rest position.
Figure 3:
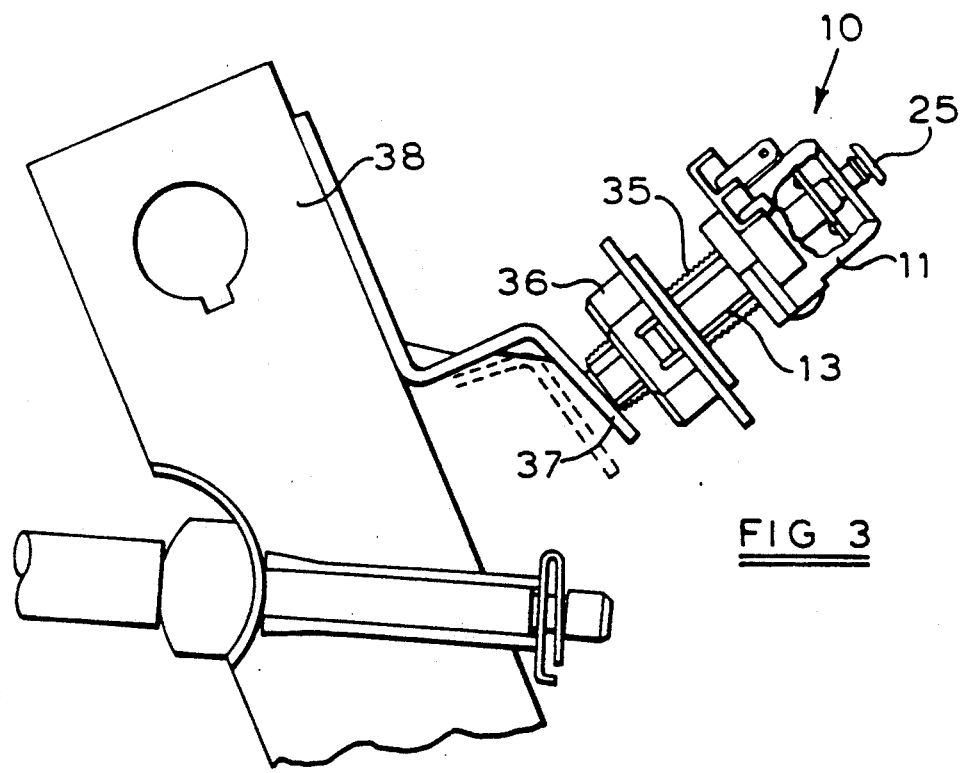
FIG. 3 is a view similar to FIG. 2 showing the brake pedal displaced rearwardly beyond its normal rest position.

As illustrated in FIGS. 2 and 3, serrations 35 are provided on the external diameter of the necktube 13. The necktube 13 is located through a bush 36 secured with respect to the vehicle in juxtaposed relationship to a bracket 37 secured to brake pedal 38. To correctly locate the stop switch 10 with respect to the brake pedal 38 when in its normal rest position, as illustrated in FIG. 2, the necktube 13 is inserted through bush 36 until end 14 of plunger 12 engages the bracket 37. The plunger 12 is then depressed into the necktube 13 until the end 18 of plunger 12 engages the plug 25 which is located in the position illustrated in FIG. 1. In this position, the gap between the contact 17 and contacts 19 and 20 is accurately set at, for example, 4 mm. The switch 10 is then rotated to bring the serrations 35 into engagement with complementary formations on the bush 36, to clamp the switch 10 axially with respect to the bush 36. When the brake is now applied, movement of the pedal 38 away from switch 10 will permit the plunger 12 to move outwardly of housing 11, until contact 17 engages contacts 19 and 20 to make the brake lamp circuit. Upon release of the brake pedal 38, the plunger 12 will be depressed into the housing 11 causing contact 17 to move out of engagement with contacts 19 and 20, breaking the brake lamp circuit.

If the brake pedal 38 returns beyond its normal rest position, as illustrated in FIG. 3, and the load applied to plug 25 by engagement with the plunger 12 exceeds the predetermined load, the plug 25 will be displaced axially rearwardly, permitting further rearward movement of plunger 12 to accommodate the excess movement of the pedal 38. The switch 10 may thus accommodate the excess rearward travel of pedal 38 without being displaced, so that when the pedal 38 returns to its normal rest position, the plunger 12 will return to its set position so that the required gap between contacts 17 and 19 and 20 is maintained.

If the switch 10 is removed for any reason, the plug 25 may be reset in its original position, as illustrated in FIG. 1, so that when refitting the switch 10, the switch 10 may again be accurately located as described above.

Various modifications may be made without departing from the invention. While the present invention is particularly suitable for switches which are secured in position by bush means as described above, it may also be used with other means of securing the switch. For example where more rigid means of securing the switch are used, the present invention may avoid damage to the switch. Furthermore other forms of stop means may be used with appropriate means of controlling the load at which such stop means may be displaced.

I claim:

1. A switch comprising a switch housing, a plunger located within the switch housing, one end of the plunger extending out of the housing, the plunger being capable of limited movement relative to the housing, an electrical contact being provided on the plunger, said electrical contact being adapted to engage an electrical contact associated with the housing at an outward limit of movement of the plunger relative to the housing, stop means being provided coaxially, and disengaged from the plunger when said plunger is at said outer limit of movement for engagement with the end of the plunger remote from said one end at a normal inward limit of movement of the plunger relative to the housing, said stop means being displaceable axially when a load in excess of a predetermined magnitude is applied thereto by the plunger, movement of the stop means permitting movement of the plunger beyond its normal inward limit of movement relative to the housing.

2. A switch according to claim 1 in which the plunger is located coaxially of a necktube defined by the switch housing, one end of the plunger extending from the neck tube, the other end of the plunger being adapted to engage a plug located coaxially of the plunger through a wall of the switch housing, the plug in one position defining the normal inward limit of travel of the plunger and being displaceable axially when a load in excess of said predetermined magnitude is applied thereto to permit movement of the plunger inwardly beyond its normal inward limit of movement.

3. A switch according to claim 2 in which the plug locates through an aperture in the wall of the switch housing, the aperture being surrounded by an annular rib which engages in a circumferential groove in the plug.

4. A switch according to claim 3 in which a second annular groove is provided adjacent the inner end of the plug.

5. A switch according to claim 2 in which the switch is located in an operative position by means of a bush, the necktube of the switch being located through the bush, formations on the necktube being provided to engage with corresponding formations on the bush to locate the necktube axially with respect to the bush.

6. A switch according to claim 1 in which the plunger is resiliently loaded outwardly.

* * * * *